June 9, 1959     E. T. LESSIG ET AL     2,889,802

CORD TREATING APPARATUS

Filed Nov. 18, 1957

INVENTORS
EDWARD T. LESSIG
MATTHEW W. WILSON
BY W. A. Shira, Jr.
ATTY.

United States Patent Office 2,889,802
Patented June 9, 1959

2,889,802

CORD TREATING APPARATUS

Edward T. Lessig, Cuyahoga Falls, and Matthew W. Wilson, Stow, Ohio, assignors to The B. F. Goodrich Company, New York, N.Y., a corporation of New York Application November 18, 1957, Serial No. 697,153

12 Claims. (Cl. 118—57)

This invention relates to an apparatus for treating cords with liquid; more particularly, to a means for preventing loose or broken cords from interfering with the operation of such an apparatus.

It is now customary to employ cords of various materials as reinforcements in tires, belts and other articles manufactured from rubber or other elastomers. These cords may be incorporated into the elastomer by a variety of different procedures, but, whether utilized in weftless or woven form, the adhesion of the cords to the elastomer is generally facilitated and the effectiveness of the bond therebetween is increased by applying to the cords an adhesive in liquid form. The application of the liquid adhesive may be accomplished by dipping, spraying, or other means but, however applied, excessive liquid should be removed from the cords substantially immediately after the application and before the cords are incorporated into the rubber or other elastomer. This removal of excessive adhesive liquid is preferably accomplished by beating or vibrating the cords as they emerge from the liquid adhesive applying operation, and before the cords are subjected to drying.

A suitable apparatus for effecting the aforementioned treatment of cords, including the removal of excessive liquid by a beating action, is disclosed and claimed in the U. S. Patent No. 2,450,847. In the use of such apparatus, however, it has been found that broken or loose cords tend to wind or wrap about the rotary vibrators or beaters. This results in unequal vibratory action upon the cords at different locations along the length of the beaters, breaking of other cords, and other improper operations which are sufficiently serious to require the beaters to be stopped so that cords wrapped thereabout can be removed. This stoppage of the beaters either results in lessened production of treated cords, if the entire operation is terminated, or the treated cords enter the drying apparatus with excessive adhesive liquid thereon in those cases when application of the liquid is continued while the beaters are out of operation. In the latter instance, the excessive liquid is deposited in the drying apparatus and causes premature shut-down for cleaning. In addition, the cords may be non-uniformly or otherwise defectively adhered to the elastomer in which they are ultimately incorporated because of lack of uniformity in the quantity of adhesive retained on the cores.

The principal object of this invention is, therefore, the provision of a means for maintaining the rotary beater of an apparatus for treating cords with liquid adhesive free of broken or loose cords without the necessity of stopping the beater or other moving parts of the apparatus.

Another object of the invention is to provide an apparatus for treating cords with liquid, and which has one or more rotary beaters for removing excessive liquid from the cords, with means cooperating with each cord beater to prevent broken or loose cords from wrapping thereabout.

A more specific object of the invention is to provide an apparatus as defined in the preceding paragraph and wherein the means cooperating with the rotatable beater is a member extending parallel to the axis of the beater and spaced from the outermost projecting portion of said beater a distance less than the diameter of a cord being treated.

A still more specific object of the invention is to provide an apparatus for applying liquid adhesive to cords while they are moving in a predetermined path and removing from the cords surplus liquid by vibrating the cords in a direction transverse to their path of movement as the result of contacting said cords with one or more rotatable members having radially extending projections, the said apparatus including a clearer bar extending adjacent each rotatable member parallel to the axis thereof and spaced from the said radially extending projections thereof a distance less than the diameter of the cords.

The invention further resides in certain novel features of the construction and in the combination and arrangement of the apparatus parts, and further objects and advantages of the invention will be apparent to those skilled in the art to which it pertains from the following description of the presently preferred embodiment which is described with reference to the accompanying drawings, forming part of this application, in which.

Figure 1:
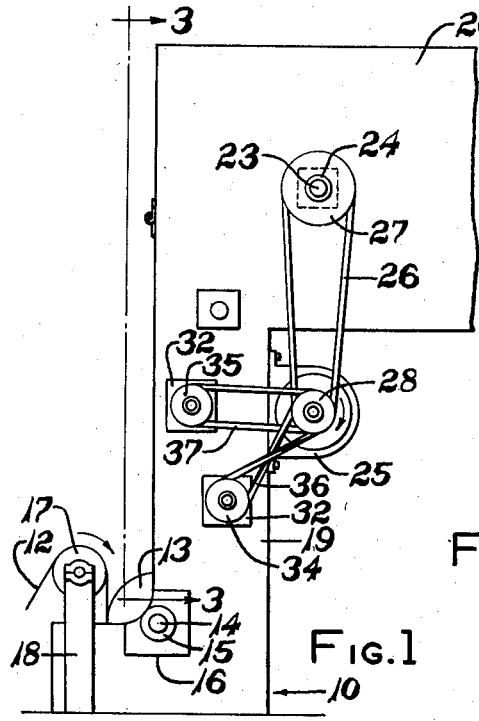
Fig. 1 is a side elevational view of a cord treating apparatus embodying the invention.
Figure 3:
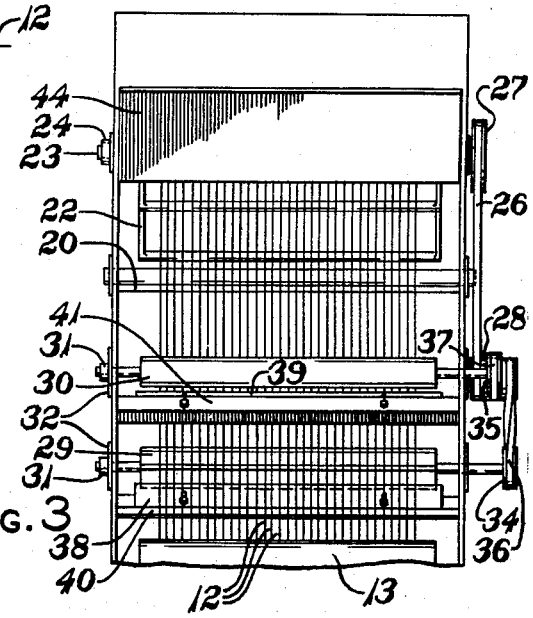
Fig. 3 is a front elevational view of the portion of the apparatus indicated by the dot-dash line 3—3 in Fig. 1 with the access door open.
Figure 2:
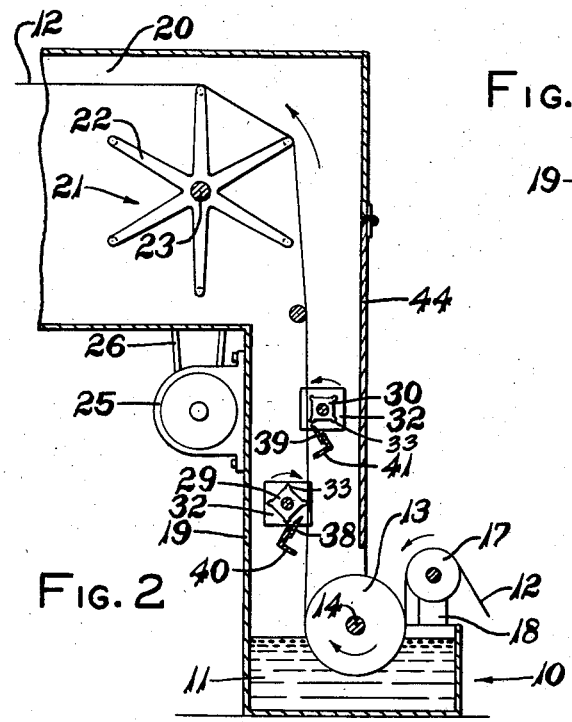
Fig. 2 is a view, partially in section and partially in side elevation, of the apparatus shown in Fig. 1 as seen from the opposite side and with the housing broken away.
Figure 4:
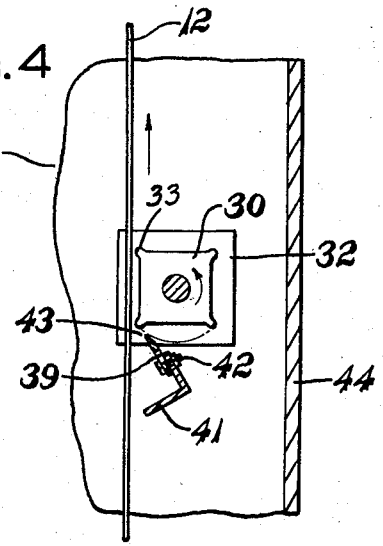
Fig. 4 is an enlarged fragmentary view of a portion of Fig. 2 more clearly illustrating the cooperation of a cord vibrator and the means for preventing cords from wrapping thereabout.

The presently preferred form of the apparatus in which the invention is embodied is illustrated in the drawings as comprising an elongated tank or trough 10 in which is contained a quantity of liquid 11 with which the cords 12 are to be treated. The liquid may be of any suitable composition and means, not shown, may be provided to supply additional liquid to and maintain the level thereof substantially constant in the tank 10. Extending lengthwise of the trough or tank 10 is a roll 13 having journal portions 14 at either end rotatably supported in bearings 15 which are here shown as carried by plates or pads 16 secured at either side of the trough or tank 10. Above the forward portion of the tank or trough 10 is a guide roll 17 which is rotatably supported upon suitable pillars or stanchions 18 at the sides of the tank.

Rising above the rear portion of the trough or tank 10 is a housing including a vertical portion 19 and an elevated horizontal portion 20 providing an enclosed passage or tunnel for the cords being treated. This housing is preferably formed of metal sheets or plates which are here shown as integral extensions of portions of the tank or trough 11 but which may be separate therefrom and may include suitable structural supports as will be readily understood. Extending transversely in the horizontal part of the housing 20 is a paddle wheel or reel 21 comprising a plurality of radially extending spaced arms 22 supported upon a suitable shaft 23. The ends of the shaft 23 are rotatably supported in bearings 24 that are here shown as secured to the sides of the portion 20 of the housing.

The cords 12, which are to be treated, are supplied and assembled into a common plane in parallel relationship by apparatus not shown. The cords, which may be either weftless or transversely joined by light pick cords, are then led in this parallel relationship over the guide roll 17 and beneath the roll 13 so that they pass through the liquid in the tank or trough 10. After emerging from the liquid, the cords next are moved upwardly through the vertical portion 19 of the housing and over the paddle wheel or reel 21 in the horizontal portion 20 of the housing to a drying apparatus of which the housing 20 may form a part.

The cords are moved in above-described path under tension by suitable means which may include power driving of various of the rotatable members over which the cords pass. As here shown, cord tensioning and movement is imparted by the paddle wheel or reel 21 which is illustrated as being driven by an electric motor 25 through a drive comprising a belt or chain 26 that extends around a pulley 27 on the shaft 23 of the paddle wheel 21 and a drive pulley 28 on the motor shaft. The desired tension may be imparted to the cords 12 in known manner by braking roll 17 or one of the rotatable members over which the cords pass before entering the apparatus or by driving such roll or rotatable member at a slower peripheral speed than that of the reel 21.

As mentioned heretofore, excessive liquid should be removed from the cords substantially immediately after they have received the application of the liquid and before they enter the drying apparatus. To accomplish this, the vertical portion 19 of the apparatus is provided with means for vibrating the cords transversely of their path of movement. In the embodiment here shown, two such means are illustrated in the form of rotatable members or beaters 29 and 30 which are disposed on opposite sides of the cords 12. These rotatable members are identical in construction and operation and each has shaft or journal portions at either end rotatably supported in bearings 31 which are secured to plates or pads 32 supported upon the sides of the housing portion 19. Intermediate the journal portions, the rotatable members have non-circular cross sections provided with radially projecting portions 33, the radial extent of each of which exceeds the distance between the undeflected path of cords 12 and the axis of the rotatable member on which it is provided. Hence, as the rotatable members or beaters 29 and 30 turn, the projections 33 strike and move the cords transversely of their path of travel. As here shown, the rotatable members or beaters 29 and 30 are substantially rectangular in cross section with the corners thereof enlarged and rounded. It will be understood, however, that this configuration of the members may be varied so long as spaced radially projecting portions are provided to impart repeated impacts to the cords and thereby induce vibrations therein. These impacts and the resulting vibrations shake excessive liquid from the cords and this liquid returns to the quantity in the tank or trough 10.

Rotation of the beater members 29 and 30 is achieved by extending one of the journal or shaft portions of each externally of its bearing and providing this extended portion with a suitable pulley, such as 34, 35, respectively, which are connected by belts 36 and 37 to appropriate pulleys upon the drive shaft of the motor 25. The drives for the beaters are preferably arranged so that these members rotate in a direction such that their projections move opposite to the direction of movement of the cords and at a rate of rotation such that the radially projecting portions strike the cords repeatedly at a speed which induces rapid vibratory motions in the cords.

The apparatus thus far described incorporates the features and principles heretofore disclosed and claimed in the previously mentioned U.S. Patent No. 2,450,847. In employing an apparatus of this nature, it has been found that broken or loose cords tended to fall upon and wrap about the rotatable beaters or vibrators 29 and 30, this action being aggravated by the adhesive nature of the liquid employed in treating the cords. As such broken or loose cords wrap about the vibrator members or beaters they tend to pull other cords out of their proper path of movement and even to break these cords or to cause tangling or other difficulties. Hence, it is necessary to free the rotating beaters of the cords wrapping thereabout substantially as soon as this condition is observed. Heretofore, this clearing of the beaters either required stopping the entire cord treating apparatus, with consequent loss of production, or else it was necessary that the beaters alone be stopped which resulted in the cords being led into the machine without having the excessive liquid removed therefrom. The latter condition frequently resulted in an inferior product and/or difficulties in the operation of other pieces of apparatus, such as the drying mechanism and the guide means for directing the cords into the calender for applying the elastomeric coating to the cords.

In accordance with this invention these difficulties are obviated by the provision of clearer members adjacent each of the rotatable beaters 29 and 30 which prevent broken or loose cords from wrapping around the beaters. The clearer members are here illustrated as longitudinally extending plates or bars 38, 39, respectively, supported beneath and adjacent the path of movement of the radially projecting portions 33 on the beaters 29 and 30. The clearer members or bars 38 and 39 are preferably disposed at an angle so that they are substantially tangential to the cylindrical path traced by the projecting edges 33. The support for the clearer members or bars may be provided by any suitable means. As here shown, the members 38 and 39 are bolted to angle members, such as 40 and 41 which extend transversely of the vertical portion 19 of the housing and are secured to the sides thereof. Either the members 38, 39 or the angle members 40, 41 have elongated slots through which the connecting bolts, such as 42, pass to permit adjustment of the clearer members or bars relative to the beaters.

The outer end of each of the clearer members or bars 38, 39 is preferably sharpened to present substantially a knife edge 43 and the members are so adjusted that the clearance between this knife edge and the radially projecting portions 33 of the beaters, at the closest approach thereof to the clearer members, is less than the diameter of the cord being treated. The construction is such that if a loose or broken cord tends to wrap around either of the beater members 29, 30, such cord will be scraped or cleared from the beater by the cooperating member or bar 38 or 39. The cord or cords thus removed from the beater will drop downwardly in the housing portion 19 and can be removed by the operator. Access to this portion of the apparatus for servicing and for removing such cords can be attained by providing a hinged door or removable panel 44 in the vertical portion 19 of the housing.

The invention has been specifically described with respect to treatment of a plurality of cords moving in parallel spaced relationship in weftless form. It will be apparent, however, that the invention is not limited to treating cords in weftless relationship but may also be used to advantage with cords which have been united by light pick or transverse cords. Moreover, the invention is not limited to treatment of any predetermined number of cords or with any particular liquid although the invention has its greatest utility in the preparation of cords for incorporation in elastomeric materials and wherein the treating liquid is adhesive in nature. It should also be understood that the invention is not limited to employing rotatable members or beaters of a particular configuration nor to a particular angle or dimension of the clearer members or bars. Variations in these features should not, however, result in the distance between the radially projecting portions of the beaters and the clearer members being greater than the diameter of a cord treated. It will be evident in view of these and other modifications which will readily occur to those skilled in the art that the invention is not limited to the precise details of construction herein illustrated and described but that variations that may be made therefrom within the limits of the spirit and scope of the appended claims.

Having thus described the invention, we claim:

1. An apparatus of the character described for treating cords as they are moved along a predetermined path, the said apparatus including a rotatable member having a plurality of circumferentially spaced axially extending radially projecting portions disposed at one side of and transversely of the path of movement of the cords and positioned to successively contact said cords and repeatedly deflect them laterally of their path of travel to thereby induce vibrations therein, and means adjacent the said rotatable member on the same side of said cord path as said member and cooperating with the said projecting portions of the latter for preventing broken cords adhering to said member from wrapping therearound.

2. An apparatus of the character described for treating a plurality of individual textile cords as they are moved in spaced apart parallel relationship along a predetermined path, the said apparatus including a rotatable member having a plurality of circumferentially spaced axially extending radially projecting portions disposed transversely of the path of movement of the cords and positioned to successively contact said cords and repeatedly deflect them laterally of their path of travel to thereby induce vibrations therein, and means cooperating with said rotatable member for preventing broken cords from wrapping therearound, the said means including a portion extending adjacent said rotatable member with a clearance relative to said projecting portions less than the diameter of the cords treated.

3. An apparatus as defined in claim 2 wherein the said means is an elongated rigid bar extending lengthwise of said rotatable member and having an edge portion disposed adjacent the projections of said rotatable member.

4. An apparatus of the character described for treating a plurality of individual textile cords as they are moved in spaced apart parallel relationship along a predetermined path, the said apparatus including a rotatable member having a plurality of circumferentially spaced axially extending radially projecting portions extending transversely of the path of movement of the cords and positioned to successively contact said cords and repeatedly deflect them laterally of their path of travel to thereby induce vibrations therein, and means for preventing broken cords from wrapping around said rotatable member comprising an elongated member stationarily supported adjacent said rotatable member with an edge portion extending parallel to the axis of said rotatable member and positioned such that the distance between the said edge portion of said elongated member and the projecting portions of said rotatable member as the latter moves past said elongated member is less than the diameter of an individual cord.

5. An apparatus as defined in claim 4 wherein the said edge portion is sharpened and the said elongated member is supported at an angle to the path of travel of said cords.

6. In an apparatus for treating a plurality of individual cords of textile material as they move in spaced apart parallel relationship along a predetermined path, which apparatus includes a means for applying adhesive liquid to said cords as they move along said path and a rotatable member having a plurality of axially extending radially projecting portions disposed transversely of the path of movement of the cords and positioned to successively contact said cords and repeatedly deflect them laterally of their path of travel to thereby induce vibrations therein sufficient to remove from the cords a portion of the adhesive liquid, the combination with said rotatable member of an elongated member stationarily supported adjacent said rotatable member with an edge portion extending parallel to the axis of said rotatable member and positioned so that the distance between the said edge portion of said stationary member and the projecting portions of said rotatable member as the said portions move past said stationary member is less than the diameter of an individual cord thereby preventing broken cords from wrapping around the said rotatable member.

7. In an apparatus for treating a plurality of individual cords of textile material as they move in spaced apart parallel relationship along a predetermined path, which apparatus includes a means for applying adhesive liquid to said fabric as it moves along said path and a rotary beater positioned to successively contact said cords and repeatedly deflect them laterally of their path of travel to thereby induce vibrations therein sufficient to remove from the cords a portion of the adhesive liquid, the combination with said beater of a stationary clearer supported adjacent said beater with an edge portion of the clearer extending parallel to the axis of said beater and positioned so that the distance between the said edge portion and the closest adjacent portions of said beater as the latter move past said clearer is less than the diameter of an individual cord thereby preventing broken cords from wrapping around the beater.

8. An apparatus for treating weftless cord fabric preparatory to its incorporation in a body of rubbery material comprising the combination of means for directing along a predetermined path a plurality of individual cords of textile material in spaced apart parallel weftless fabric relationship, means including a tank disposed along said path for applying adhesive liquid to said fabric, a rotatable member supported with its axis of rotation extending at one side of and transversely of the path of movement of the fabric after passing said liquid applying means, said member including axially extending projecting edges disposed transversely of the fabric with the said edges positioned to engage the fabric upon each rotation of the member to deflect the cords from their normal path and induce vibrations therein sufficient to remove a part of the adhesive liquid, and means adjacent the said rotatable member on the same side of said cord path as said member and cooperating with the projecting portions of the latter for preventing broken cords adhering to the said rotatable member from wrapping therearound.

9. An apparatus for treating weftless cord fabric preparatory to its incorporation in a body of rubbery material comprising the combination of means for directing along a predetermined path a plurality of individual cords of textile material in spaced apart parallel weftless fabric relationship, means including a tank disposed along said path for applying adhesive liquid to said fabric, a rotatable member supported with its axis of rotation extending transversely of the path of movement of the fabric after passing said liquid applying means, the said member including axially extending projecting edges disposed transversely of the fabric with the said edges positioned to engage the fabric upon each rotation of the member to deflect the cords from their normal path and induce vibrations therein sufficient to remove a part of the adhesive liquid, and means to prevent broken cords from wrapping around said rotatable member comprising a stationary member with a portion extending transversely of the path of movement of said fabric and adjacent the rotatable member in the vicinity of the said fabric with the space between said stationary member and the projecting edges of the rotatable member being less than the diameter of one of the said cords.

10. An apparatus as defined in claim 9 wherein the said stationary member is an elongated metal bar extending lengthwise of said rotatable member and having a cutting edge portion adjacent the rotatable member cooperating with the latter to remove therefrom cords adhered thereto.

11. An apparatus as defined in claim 9 wherein the said stationary member is supported at an angle to the path of travel of said cords.

12. An apparatus as defined in claim 9 wherein the said stationary member is supported substantially tangentially to the cylindrical path traced by the projecting edges of said rotatable member.

References Cited in the file of this patent

UNITED STATES PATENTS

| | | |
|---|---|---|
| 2,450,847 | Wilson | Oct. 5, 1948 |
| 2,481,197 | Caille | Sept. 6, 1949 |